United States Patent [19]
Antelman

[11] Patent Number: 5,223,149
[45] Date of Patent: Jun. 29, 1993

[54] TRIVALENT SILVER WATER TREATMENT COMPOSITIONS

[75] Inventor: Marvin S. Antelman, Rehovot, Israel

[73] Assignee: N. Jonas & Co., Inc., Bensalem, Pa.

[21] Appl. No.: 884,712

[22] Filed: May 18, 1992

[51] Int. Cl.$^5$ .............................................. C02F 1/50
[52] U.S. Cl. .................................. 210/764; 210/167; 210/169; 424/618; 424/668; 422/19; 422/28; 422/37; 422/905; 514/495
[58] Field of Search ............... 210/167, 169, 764, 916; 514/495; 424/618, 668; 422/19, 28, 905, 37

[56] References Cited

U.S. PATENT DOCUMENTS

| | | | |
|---|---|---|---|
| 5,073,382 | 12/1991 | Antelman | 210/764 |
| 5,078,902 | 1/1992 | Antelman | 210/764 |
| 5,089,275 | 2/1992 | Antelman | 210/764 |
| 5,098,582 | 3/1992 | Antelman | 210/759 |

*Primary Examiner*—Peter Hruskoci
*Assistant Examiner*—Neil M. McCarthy
*Attorney, Agent, or Firm*—Salter, Michaelson & Benson

[57] ABSTRACT

A method for controlling the growth of bacteria and algae in utilitarian bodies of water such as industrial cooling towers, swimming pools and hot tubs is described. The method comprises adding to the water novel trivalent silver compounds. Said compounds are light stable and can be supplied as liquid concentrates which will not precipitate any silver whatsoever from saline waters nor will the concentrates stain skin or discolor surfaces. Said compounds meet the rigid EPA standards of killing 100% of select coliforms within ten minutes and are efficacious at concentrations as low as 1-2 PPM.

12 Claims, No Drawings

TRIVALENT SILVER WATER TREATMENT COMPOSITIONS

BACKGROUND OF THE INVENTION

The present invention relates to the employment of trivalent silver (Ag[III]) compounds as bactericidal and algicidal agents in water treatment. Water soluble trivalent silver compounds are part of the class of multivalent silver compounds which have been the subject of patents granted to the instant inventor for water treatment. To date five such patents have been granted, namely, U.S. Pat. Nos. 5,017,295; 5,073,382; 5,078,902; 5,089,275; and 5,098,582. These patents all deal with divalent silver compounds and compositions that are anti-pathogenic but more particularly with (respectively) soluble complexes, alkaline pH stable compositions, halides, solid stabilized complexes and solid black oxide. All of said compounds more particularly related to treating utilitarian bodies of water defined as bodies of water having an ultimate use such as swimming pools, hot tubs, industrial cooling towers and municipal reservoirs where pathogens are known to proliferate. While all of the cited patents describe multivalent silver compounds which have many novel advantages in treating said bodies of water and while they all conform to regulatory requirements for treating said bodies of water, such as the rules and regulations of the Environmental Protection Agency for treating swimming pools, none of the above inventions provides for an antipathogenic composition which embodies all of the following characteristics:

1. A liquid composition;
2. Not precipitated out by halides present in the water treated;
3. Non-staining in concentrated form to human skin and to the surfaces of the containing vessel of said bodies of water.

None of the previously patented compounds or compositions met all of these three criteria, despite the fact that each invention embodied unique compositions of Ag(II) moieties. The first patent, for example, in its preferred embodiments dealing with Ag(II) complexes, though of liquid composition, stained the skin in concentrated form and precipitated cupious white material when introduced into saline bodies of water. While of all the previous patents the silver halides were free of this nuisance and were nonstaining, they all were solid compositions which were totally insoluble in water. Accordingly, a composition meeting these three criteria was sought. Therefore, attempts were made to synthesize water soluble Ag(III) compounds, and testing and evaluation of their efficacy to see whether they met all the aforementioned criteria. The Ag(II) compositions were all light stable and it was verified as anticipated for Ag(III) as well. Accordingly, the tests and evaluations proved successful which has led to the final development of this invention, namely, trivalent silver compositions capable of killing and/or preventing the replication of gram positive and gram negative bacteria, as well as algae in utilitarian water bodies, such as swimming pools, which can be supplied in liquid concentrate form which will not stain the skin nor precipitate in the presence of halides.

In the course of the testing of the compositions of this invention, another previously unanticipated advantage of these compositions became evident. Whereas all the previous Ag(II) compositions required additions of oxidizing agents, such as alkali metal persulfates, to synergize their efficacy, these compositions required no such additions and were efficacious in themselves.

OBJECTS OF THE INVENTION

The main object of this invention is to provide compositions embodying trivalent silver compounds capable of killing and/or inhibiting the growth of bacteria and algae, particularly in utilitarian bodies of water when said compositions are added to said water supply.

Another object of the invention is to provide a source of trivalent silver ions capable of meeting the regular EPA standards for swimming pools and hot tubs, mainly, a bactericide capable of achieving 100% kills within ten minutes.

Still another object of the invention is to provide for a trivalent silver composition which will perform the aforementioned anti-pathogenic functions and will not be subject to the formation of a precipitate in the presence of halides.

Still another object of the invention is to provide a trivalent silver composition having all of the aforementioned functions and characteristics, but which will not stain the skin nor discolor surfaces with which it is in contact in its concentrated liquid form.

Still another object of the invention is to provide a trivalent silver composition having all of the aforementioned functions, but which can be formulated into a marketable concentrated liquid product for utilization in utilitarian bodies of water.

Still another object of the invention is to provide a trivalent silver composition having all of the aforementioned functions and characteristics, but which can perform its anti-pathogenic functions without the need of adding an oxidizing agent to the composition.

A final object of the invention is to provide a trivalent silver composition having all of the aforementioned functions and characteristics, but which is also light stable, unlike monovalent silver compounds.

Other objects, features, functions and characteristics of the present invention will become apparent to those skilled in the art when the present invention is considered in view of the accompanying examples. It should, of course, be recognized that the accompanying examples illustrate preferred embodiments of the present invention and are not intended as a means of defining the limits and scope of the present invention.

SUMMARY OF THE INVENTION

This invention relates to the utilization of trivalent silver compounds for bactericidal and algicidal applications in utilitarian bodies of water, such as swimming pools, hot tubs, municipal and industrial water supplies, as for example, cooling towers.

More particularly, this invention concerns stable Ag(III) complexes designated by the principal quantum number, $n=4$, and the second quantum number $l=2$, delineating sublevel d having eight electrons, the accepted conventional expression being $d^8$ complexes in contradistinction to the $d^9$ divalent complexes and $d^{10}$ monovalent complexes of silver.

Trivalent silver complexes were prepared by either reacting Ag(I-III) tetrasilver tetroxide with a ligand bearing compound capable of forming Ag(III) complexes or reacting an Ag(I) salt in the presence of said ligand with an oxidizing agent, such as alkali persulfate, or in the alternative, by reacting Ag(III) hydroxide complex formed electrolytically by the anodic oxidation of silver in an alkali solution.

Said trivalent silver complexes were subsequently evaluated as to their efficacy in killing gram positive and gram negative bacteria in algae in accordance with the EPA protocols for swimming pools, which require 100% kills of bacteria within ten minutes. The compounds far exceeded the bacteria requirements at concentrations of one PPM or less of silver. They were evaluated with and without persulfate salts at 10 PPM and were effective without persulfates as bactericides.

The complexes were then evaluated with salt concentrations as high as 10% without precipitating halide.

The complexes, which were colored from deep orange to brown and maroon, were left exposed in clear glass bottles for three months with constant exposure to daylight. The complexes were stable and did not decompose to silver.

Ag(III) complexes were applied to human skin in concentrated form containing as much as 5,000 PPM silver without any silver staining of the skin whatsoever.

Of all the Ag(III) complexes prepared, the easiest to prepare were periodate complexes. Accordingly, a particular Ag(III) periodate complex was selected for evaluation against algae and it proved effective.

The particular Ag(III) periodate selected was prepared by the action of potassium hydroxide on tetrasilver tetroxide ($Ag_4O_4$) and is depicted by the following reaction:

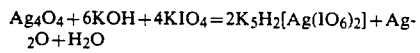

The Ag(III) periodate complexes can be depicted by the following structure:

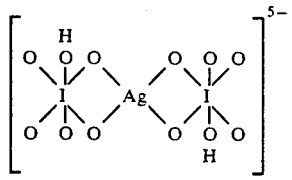

Several Ag(III) periodates have been identified which conform to this structure, in addition to the aforementioned one, which was designated by Servian, J. and Buenafama, H.D., *Inorganic Nuclear Chemistry Letters.* 1969, 5, 337-8. Another formula is:

(Cohen, G. and Atkinson, G., *Inorganic Chemistry* 1964, 3, 2, 1741-2.)

DESCRIPTION OF THE PREFERRED EMBODIMENTS

As illustrative of the preferred embodiments of this invention are the following examples.

EXAMPLE 1

An Ag(III) periodate was prepared by calculating the amounts of reactant necessary to form the periodate complex according to the aforementioned reaction equation involving KOH, 0.15 grams; tetrasilver tetroxide 1.0 gram and potassium periodate 2.0 grams. The KOH was first dissolved in 20 ml. of distilled water and the subsequent ingredients were added, and the entire mixture was heated and kept at 65 degrees C. for two hours. At the end of that time, the supernatant liquid, which had a rich orange-maroon color, was separated and was filtered and submitted for analysis to an independent laboratory, after it was diluted to a total volume of 100 ml. in a volumetric flask. The resulting solution assayed 3290 mg./L Ag and represented a 76% yield of Ag(III) periodate based on the aforementioned reaction stoichiometry. Having evaluated the silver concentration via an independent EPA certified laboratory, Ag(III) periodate aliquots were submitted to another EPA certified laboratory for bactericidal evaluation of the Ag(III) complex. Accordingly, good laboratory practice was followed in accordance with FIFRA and ffdca/40 CFR 160, May 2, 1984. The bacteria employed were *E. coli*, a gram negative pathogenic bacillus. The protocol employed for the evaluations was that as set forth in AOAC (15th) 1990:965:13 at colony densities of 100K/cc.;,utilizing two exposure times, i.e., five and ten minutes. Concentrations of Ag(III) evaluated were 0.5, 1.0 and 3.0 PPM. The evaluation pH was 7.5. Testing was done with controls and with and without potassium persulfate at a concentration of 10 PPM. There was 100% inhibition of the colonies after ten minutes at all concentrations and after five minutes except for the 0.5 PPM solution.

Having completed the aforementioned evaluations, another EPA certified laboratory was chosen for more comprehensive testing according to the aforementioned protocols excepting that sodium persulfate at 10 PPM was added to the Ag(III) periodate and tested against said periodate at zero persulfate and testing was also done on cultures of Streptococcus faecalis.

Here is a summary of the results in terms of the time required to give 100% kills of bacteria.

| BACTERIA | STRAIN | PERS (PPM) | Ag (PPM) | TIME (MIN) |
|---|---|---|---|---|
| Strep. | 6569 | 0.0 | 2.0 | 4.0 |
| faecalis | | 10.0 | 2.0 | 0.5 |
| | | 0.0 | 1.0 | 5.0 |
| | | 10.0 | 1.0 | 2.0 |
| E. coli | 11229 | 0.0 | 2.0 | 2.0 |
| | | 10.0 | 2.0 | 0.5 |
| | | 0.0 | 1.0 | 5.0 |
| | | 10.0 | 1.0 | 2.0 |

EXAMPLE 2

An ATTC strain of Chorella was grown in nutrient Medium 866 broth under the required lighting. When optimal growth was reached, the number of organisms per ml. were determined by microscopic count and then subcultured. The first Ag(III) periodate complex was applied to the algae at concentrations of 2 PPM and 4 PPM. The algae were left in contact for one hour, one day and ten days. The protocol for these tests involved procedures described in the Water and Waste Water Manual of the United States Public Health Service. The exposure tests involved post inoculation in order to determine whether the compound was algicidal or algistatic. The Ag(III) periodate complex was found to be algistatic at 2 PPM and algicidal at 4 PPM after one hour's exposure. After one day and ten days, there were no positive flasks at all. Ten flasks of subculture were utilized for each test.

EXAMPLE 3

Trivalent silver biguanide (Ag[III] bg) was prepared by modifying the procedure of D. Sen described in the *Journal of the Chemical Society* (A) 1969, p. 1304. Biguanide sulfate was stirred in suspension in distilled water using 6 g./100 cc. of the compound (pH=2.8-3.0). 5 g. of sodium bicarbonate were added slowly to adjust the pH. The final pH was 7.7. Accordingly, the pH adjustment resulted in a clear solution. 5 cc. of 10% silver nitrate were then added to the clear solution followed by 20 cc. of a 5% sodium persulfate solution. At the end of two hours, a beautiful precipitate of maroon colored Ag(III) bg was obtained, which was decanted, purified and separated. The resulting compound was then suspended in distilled water and serially diluted with distilled water so as to give a resulting solution which was 3 PPM in Ag(III). Sodium persulfate was then added to this solution to give a final concentration of 10 PPM of persulfate. The resulting solution was submitted to the same testing laboratory for the same type of *E. coli* efficacy as described in Example 1. There was 100% inhibition of *E. coli* within five minutes.

While there is shown and described herein certain specific examples embodying the invention, it will be manifest to those skilled in the art that various modifications and rearrangements of the invention may be made without departing from the spirit and scope of the underlying inventive concept and that the same is not limited to the particular forms herein shown and described except insofar as indicated by the scope of the appended claims.

What is claimed is:

1. A method for limiting the growth of bacteria and algae in the water of swimming pools, industrial cooling towers, hot tubs and reservoirs which comprises adding to the water a stable trivalent silver compound.

2. The method as claimed in claim 1 wherein the trivalent silver compound is a periodate.

3. The method as claimed in claim 1 wherein the said water is salt water, and wherein no silver halide is caused to precipitate.

4. The method as claimed in claim 2 wherein the said water is salt water, and wherein no silver halide is caused to precipitate.

5. The method as claimed in claim 1 wherein said trivalent silver compound is supplied as a liquid concentrate.

6. The method as claimed in claim 2 where said trivalent silver periodate is supplied as a liquid concentrate.

7. The method as claimed in claim 1 wherein said trivalent silver compound is employed without adding an oxidizing agent.

8. The method as claimed in claim 2 wherein said trivalent silver periodate is employed without adding an oxidizing agent.

9. The method as claimed in claim 1 where said trivalent silver compound concentrate will not stain skin or surfaces with which it is in contact.

10. The method as claimed in claim 2 where said trivalent silver periodate concentrate will not stain skin or surfaces with which it is in contact.

11. The method as claimed in claim 1 where said trivalent silver compound is light stable so as not to discolor or leave black silver films on the inner surface of vessels containing the water to be treated.

12. The method as claimed in claim 2 where said trivalent silver periodate is light stable so as not to discolor or leave black silver films on the inner surface of vessels containing the water to be treated.

* * * * *